(No Model.) 9 Sheets—Sheet 1.

J. T. COWLEY.
CASH CARRIER APPARATUS.

No. 568,716. Patented Sept. 29, 1896.

(No Model.)  9 Sheets—Sheet 2.

J. T. COWLEY.
CASH CARRIER APPARATUS.

No. 568,716. Patented Sept. 29, 1896.

(No Model.) 9 Sheets—Sheet 3.
J. T. COWLEY.
CASH CARRIER APPARATUS.

No. 568,716. Patented Sept. 29, 1896.

Witnesses:
E. L. Harlow
S. H. Frow.

Inventor.
Jos. T. Cowley
By Schwarer Burk
Attys (No Model.) 9 Sheets—Sheet 4.
J. T. COWLEY.
CASH CARRIER APPARATUS.

No. 568,716. Patented Sept. 29, 1896.

(No Model.) 9 Sheets—Sheet 7.
J. T. COWLEY.
CASH CARRIER APPARATUS.
No. 568,716. Patented Sept. 29, 1896.

(No Model.)  J. T. COWLEY.  9 Sheets—Sheet 8.
CASH CARRIER APPARATUS.

No. 568,716. Patented Sept. 29, 1896.

(No Model.)

J. T. COWLEY.
CASH CARRIER APPARATUS.

No. 568,716.

Patented Sept. 29, 1896.

UNITED STATES PATENT OFFICE.

JAMES T. COWLEY, OF LOWELL, MASSACHUSETTS, ASSIGNOR TO THE LAMSON CONSOLIDATED STORE SERVICE COMPANY, OF NEWARK, NEW JERSEY.

CASH-CARRIER APPARATUS.

SPECIFICATION forming part of Letters Patent No. 568,716, dated September 29, 1896.

Application filed September 20, 1894. Serial No. 523,629. (No model.)

*To all whom it may concern:*

Be it known that I, JAMES T. COWLEY, of the city of Lowell, county of Middlesex, and State of Massachusetts, have invented a new and useful Improvement in Cash-Carrier Apparatus, of which the following is a specification.

This invention relates to certain improvements in that class of apparatus which is employed in stores for conveying cash or parcels from the salesman to the cashier and returning the same to the salesman, and especially to that class of cash-carriers in which there is provided a traveling cable to which the cash boxes or baskets are attached and from which they are detached by suitable devices. In such device one part of said endless cord is used for conveying boxes to the cashier's desk and the other part to return said boxes to the respective salesman's station.

The object of this invention is to simplify the construction of such class of devices and produce a machine not only more efficient than the present device in use, but at the same time much less expensive in construction.

My invention consists of certain novel features, arrangements, and combinations hereinafter described, and particularly pointed out in the claims.

In the accompanying drawings, which illustrate my invention.

Like letters of reference refer to like parts throughout the several views.

Figure 1:
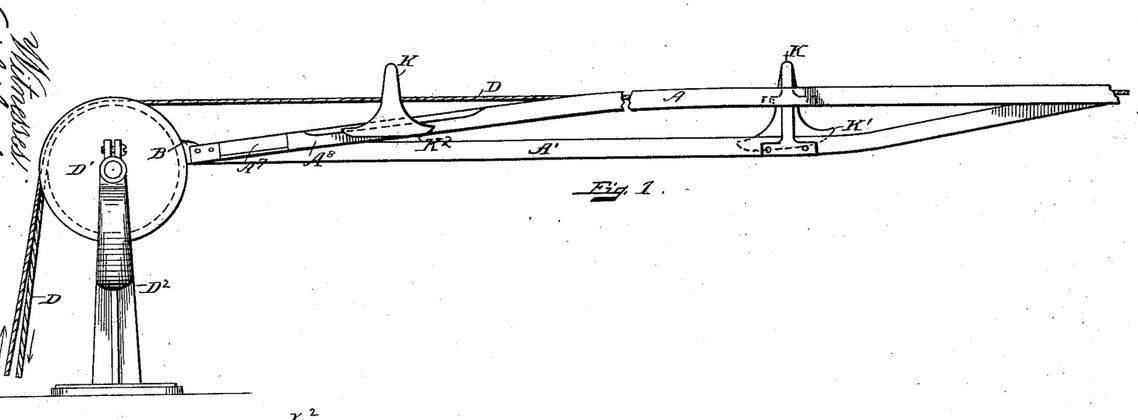
Figure 1 is a side view of the apparatus at the cashier's station.
Figure 2:
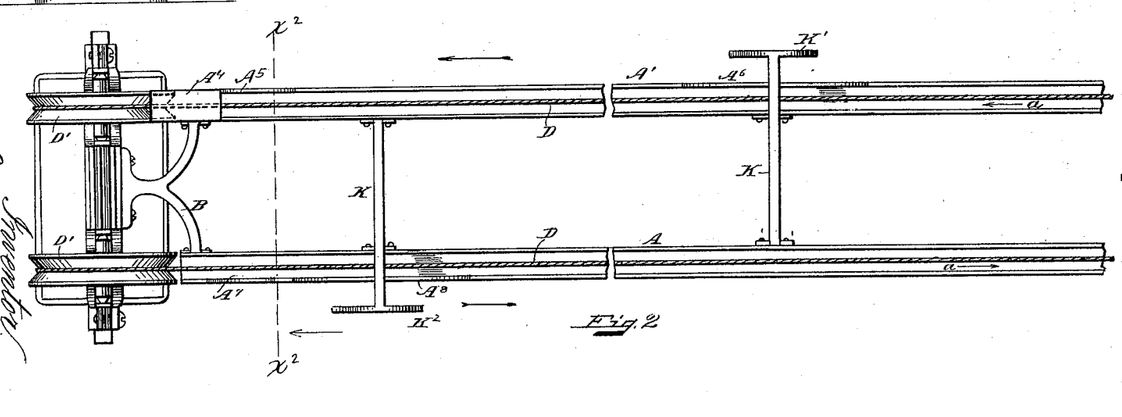
Fig. 2 is a plan view of the apparatus at the cashier's station.
Figure 3:
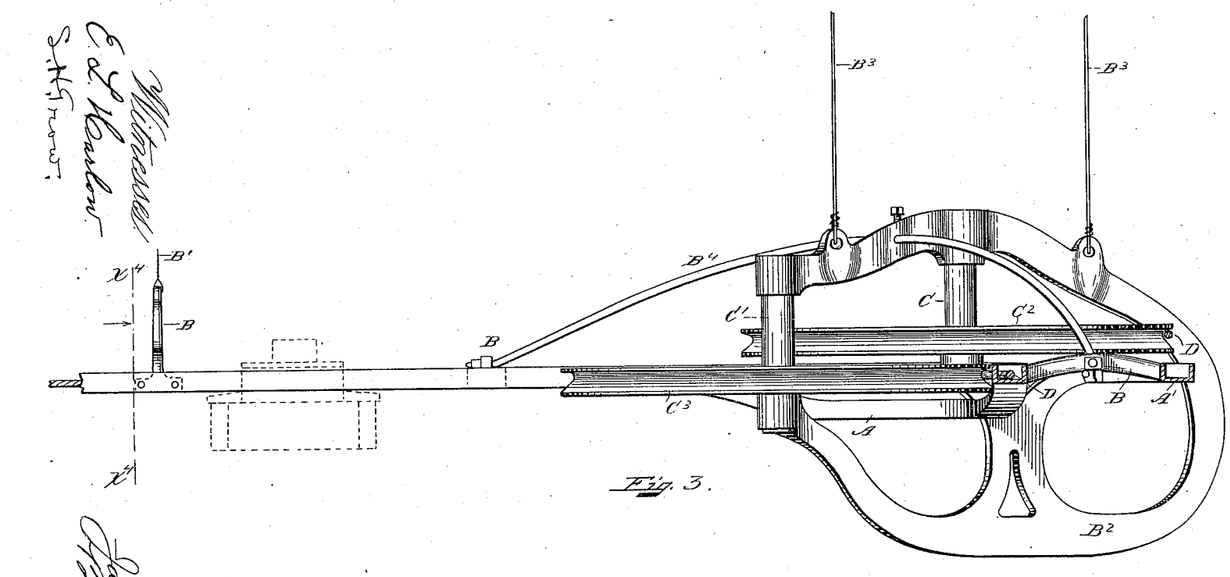
Fig. 3 is a side view of the system at one of the bends looking from the line $x\ x$, Fig. 4, in the direction indicated by the arrow.
Figures 4, 15:
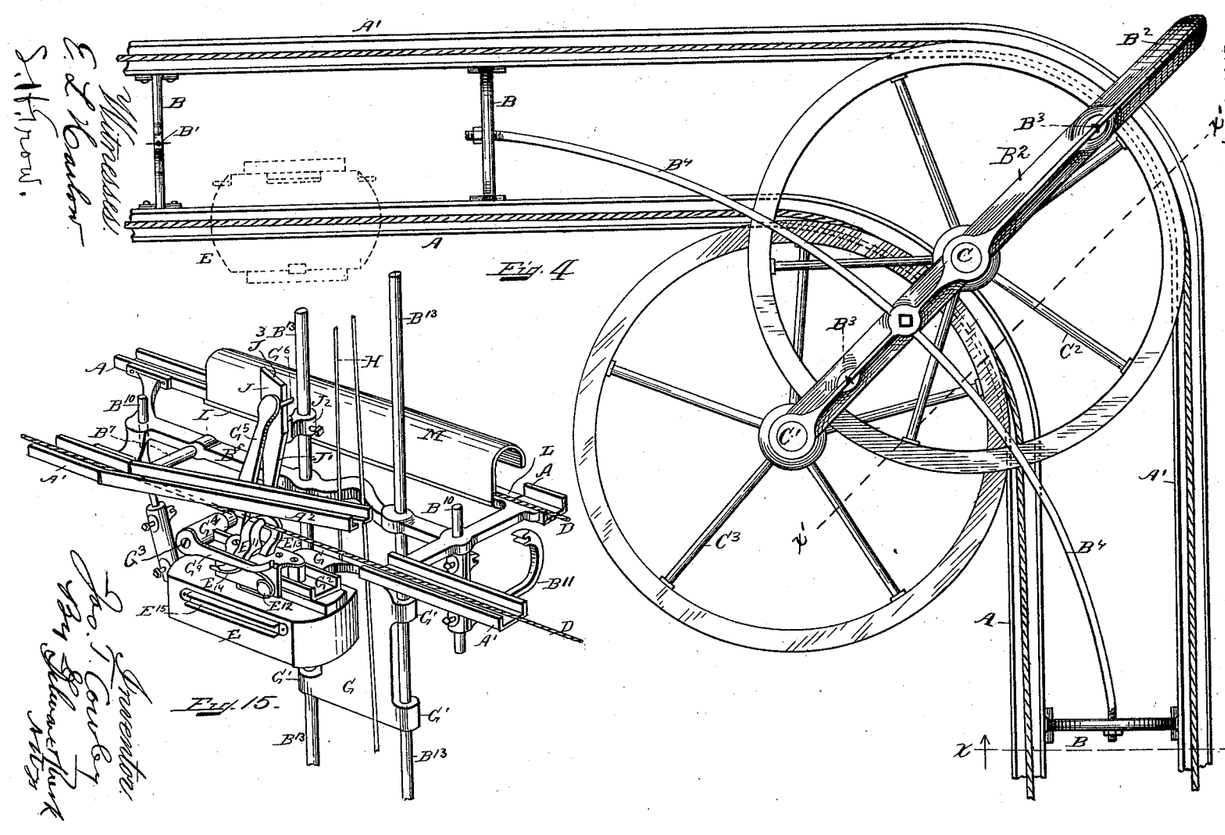
Fig. 4 is a plan view of the same bend shown in Fig. 3.
Fig. 15 is a detail perspective view of the elevator-carriage with a carrier located therein and showing the position of the parts when a carrier has been placed in position and raised to the forwarding-cable.
Figure 5:
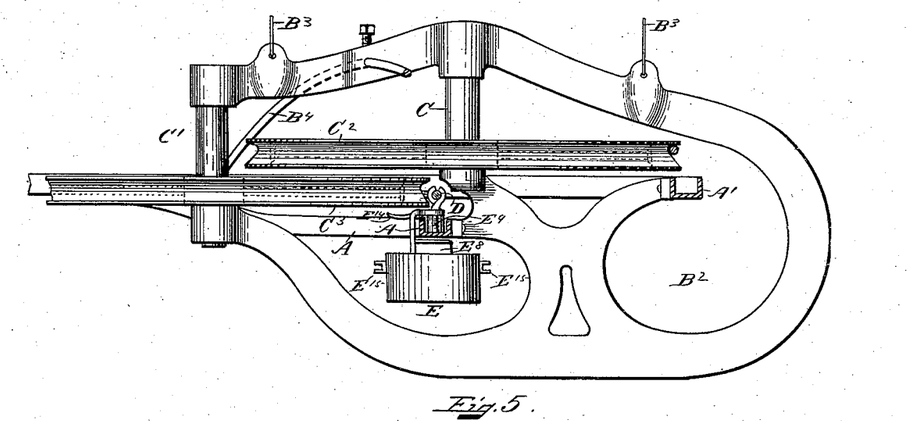
Fig. 5 is a side view of the system at one of the bends looking from the line $x'\ x'$, Fig. 4, in the direction indicated by the arrow.
Figure 6:
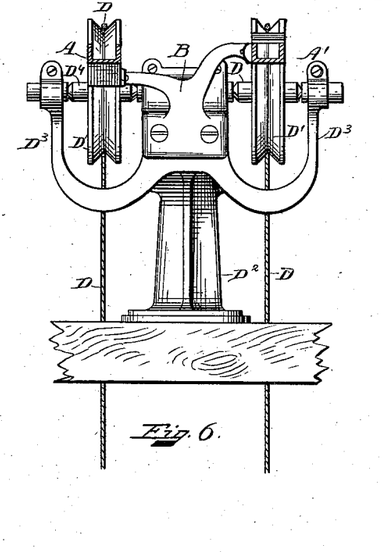
Fig. 6 is an end view taken on the line $x^2\ x^2$, Fig. 2, and looking in the direction indicated by the arrow.
Figure 7:
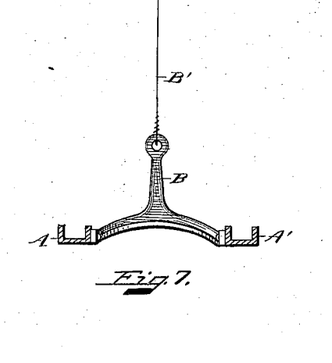
Fig. 7 is a cross-section of the track, taken on the line $x^4\ x^4$, Fig. 3, looking in the direction indicated by the arrow.
Figure 8:
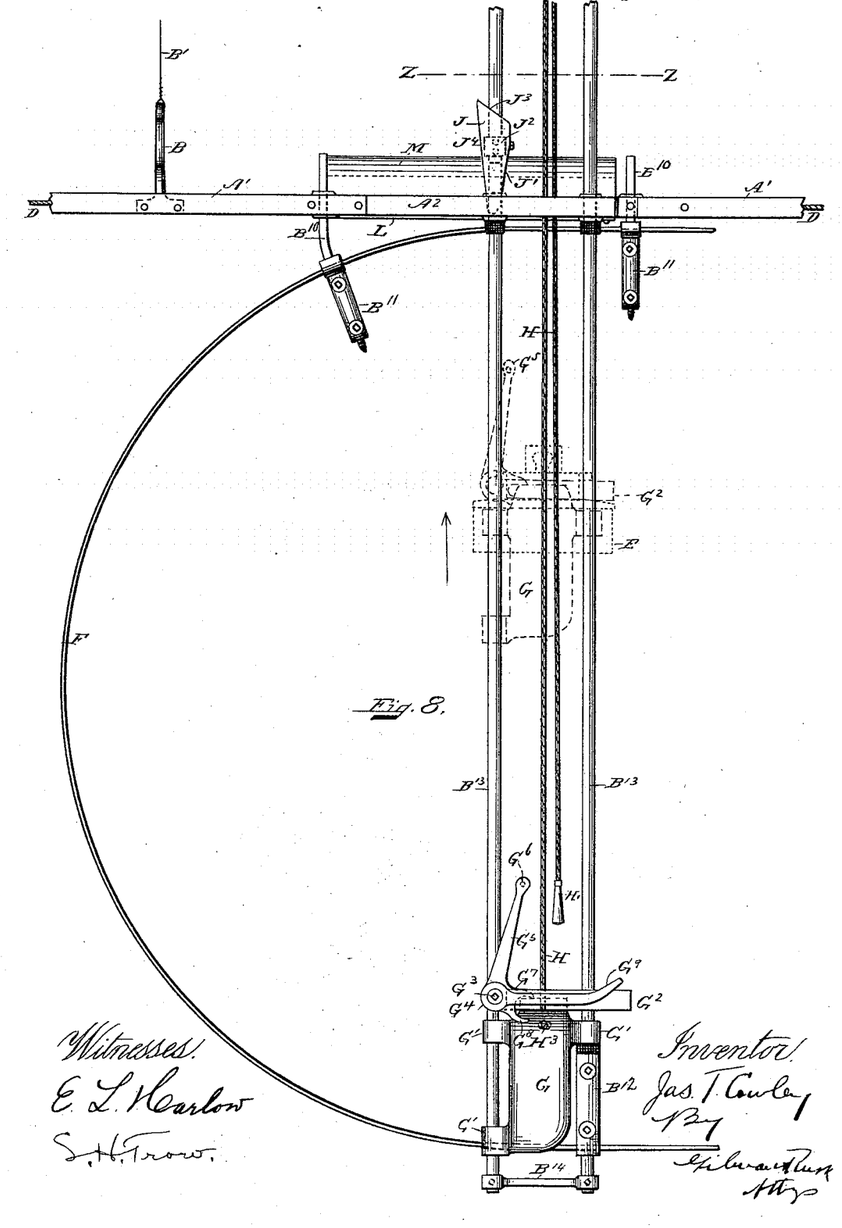
Fig. 8 is a side view of the system at one of the salesmen's stations on the side leading from the salesman's station to the cashier.

The track consists of two opposite parallel troughs A A', (see Figs. 1, 2, 3, and 4,) which are connected and secured together by brackets B, and supported a suitable distance from the floor by rods or wires B', secured to the ceiling and to the brackets B. The track, at a bend, as shown in Figs. 3, 4, and 5, has a bracket B², which extends over and under the troughs A A'. Suitable rods B³ are secured to this bracket B² and to the ceiling, and support the same in order to brace and strengthen the system at this point, and suitable cross-rods B⁴ extend from the bracket B on one side of the bend to a bracket B on the opposite side of the bend. (See Figs. 3 and 4.) This bracket $B^2$ also provides journals for the shafts C C', on which are mounted the wheels $C^2$ and $C^3$, respectively. The endless cord or cable D runs in the troughs A A', and at the cashier's end extends downwardly around the pulleys D' to a pulley, (not shown,) by which it is driven, and it moves in the direction indicated by the arrows $a$, Figs. 1 and 2, and at its farther end it passes around a suitable pulley (not shown) provided with a suitable take-up device for the cable, many forms of which are in common use. The pulleys D' at the cashier's station (see Figs. 1, 2, and 6) are mounted in a support $D^2$, and have on opposite sides the arms $D^3$, between which and the body of the support the shafts $D^4$ of the pulleys D' are mounted and adapted to revolve. One of the brackets B, by which the tracks or troughs A A' are connected and supported, extends from the side of the support $D^2$, as shown in Fig. 2, and is secured to the inner sides of the said troughs A A'.

The cable D, on its forwarding side, leading from the salesmen's stations to the cashier, passes around the wheel $C^2$, and in passing from the cashier to the salesmen's stations passes around the wheel $C^3$, supported in the bracket $B^2$ at the bend of the track shown in Figs. 3, 4, and 5. The cash-box, which is shown in Figs. 16, 17, 18, 19, 20, and 21, consists of the body E, having a cover E' on its under side, which is held closed by a spring-clamp $E^2$ against the tendency of the spring $E^3$ on the shaft $E^4$ to open said cover. On the top of the box opposite the cover E' there is arranged a trough-shaped piece $E^5$, which has two right-angle projecting pieces $E^6$ and $E^7$. Over the part $E^6$ there is arranged a piece of hard-rubber fiber $E^8$, both of which are suitably secured to the cash-box by screws. On the under side of the projecting piece $E^7$ there are secured two pieces of hard-rubber fiber $E^8$, between which are located the downwardly-projecting lugs $E^{10}$ from the piece $E^7$, which lugs form journals for the movable finger $E^{11}$, which, under the pressure of the spring $E^{12}$, is held closed against the upper end of the vertical fixed member $E^{13}$, which is cast with or otherwise secured to the piece $E^7$.

The fixed member $E^{13}$ and the movable member $E^{11}$ together form the cam-grip, by which the box is gripped or attached to the cable D. On opposite sides of the box are located flanges $E^{15}$, the location of which may be varied, depending upon the station at which it is desired to divert the carrier to the proper salesman, as will be hereinafter explained.

Figure 9:
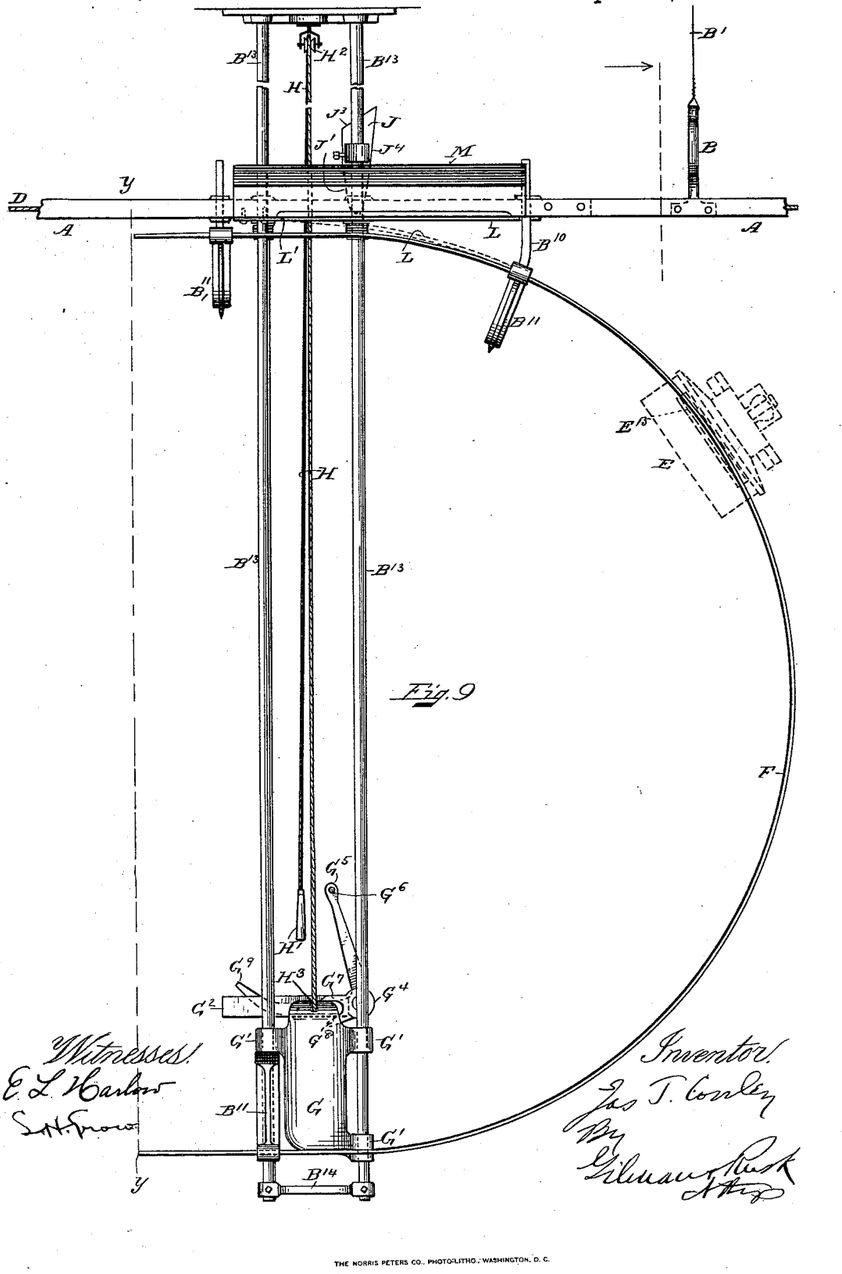
Fig. 9 is a side view of the system at one of the salesmen's stations on the side returning from the cashier to the salesman.
Figures 10, 11, 12, 13, 14, 16:
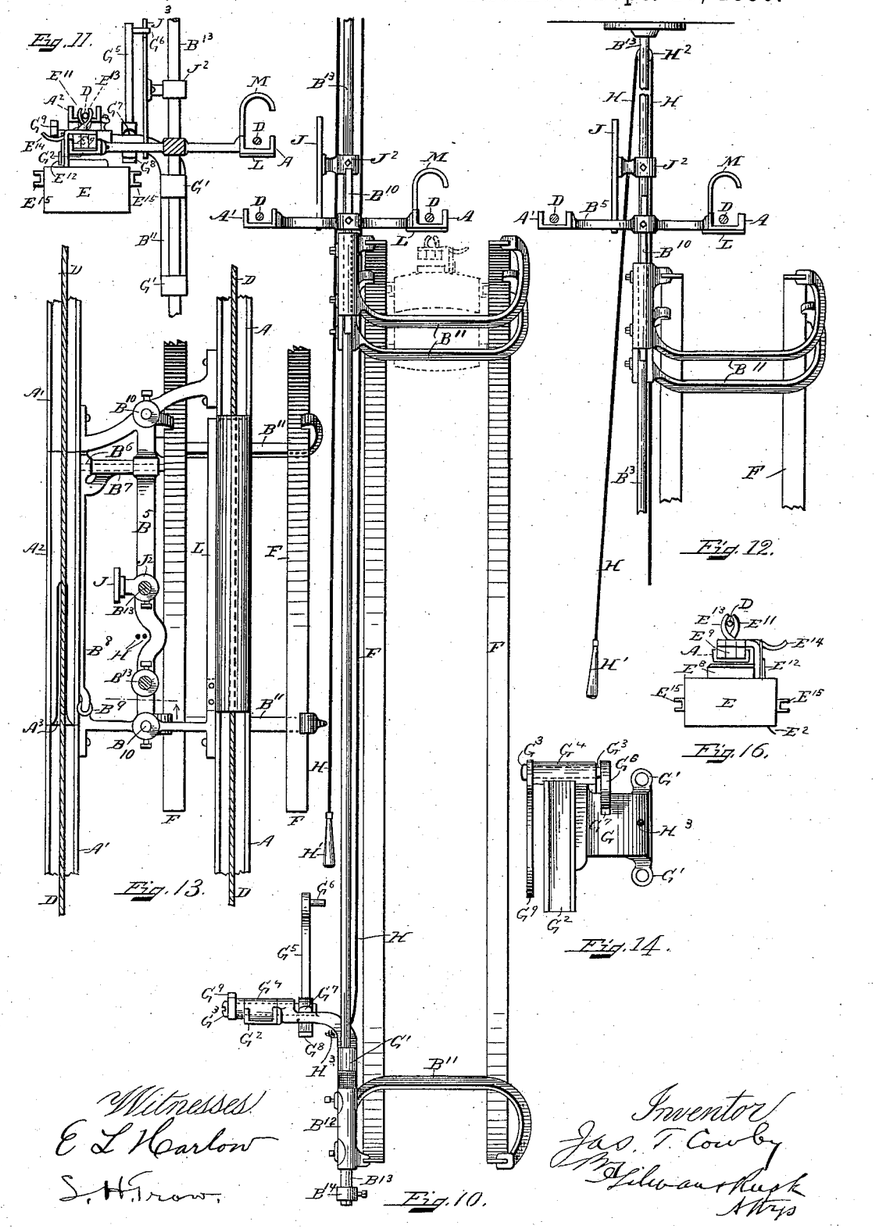
Fig. 10 is a view taken on line $y\ y$, Fig. 9, and showing in end elevation the forwarding and return tracks and the switch-guides for guiding the carrier from the return-track down to the salesman and also showing the elevating devices for raising the carrier from the salesman to the cable on the forwarding-track.
Fig. 11 is a detail view showing in end elevation the forwarding and return tracks with the cash-box and elevator in the upper position and the parts arranged for the gripping of the box to the cable.
Fig. 12 is a detail view taken on the same lines as Fig. 10 and showing the upper part of the switch-guides.
Fig. 13 is a plan view taken at one of the salesmen's stations and showing the forwarding and return tracks, the cable located in same, and the guides for the diverted carriers at the salesmen's stations, the view being taken looking downwardly from the line $z\ z$, Fig. 8.
Fig. 14 is a detail plan view of the elevator on which the box is placed to be raised by the salesman to the cable on the forwarding-track.
Figs. 16, 17, 18, 19, 20, and 21 respectively represent end elevation, top plan, bottom plan, end elevation with box turned on one side, side elevation with opening of the box on top, and elevation of opposite side with opening of box on the bottom.
Figure 17:
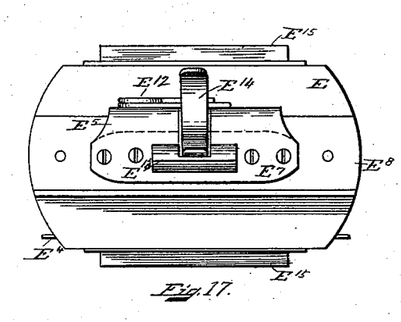
Figure 18:
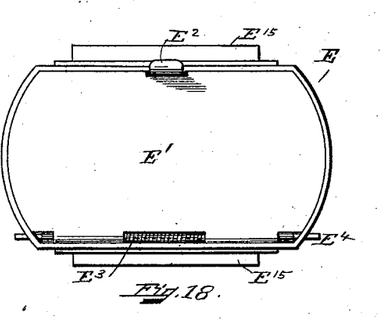

The carriers are suspended and carried in the troughs A A' by the hard-rubber fiber $E^9$. (Shown in Figs. 5, 11, 15, and 16.) At each salesman's station, referring now to Figs. 9 to 15, inclusive, it will be seen that there is a bracket $B^5$, by which the tracks A and A' are secured together and supported. Around a pin $B^6$ there is a sleeve $B^7$, which forms a part of the piece $B^8$, extending along the side of and secured to the pivoted section $A^2$ of the track A', and at the forward end of said strip there is a rubber piece $B^9$, which is adapted to contact with the side extension of the bracket $B^5$ when the pivoted section $A^2$ is in its normal position. From each side of the bracket $B^5$ there extend downwardly at each extremity bracket-rods $B^{10}$, to which are secured the curved supports $B^{11}$, supporting and holding the curved guiding-pieces F, by which the carriers, returning from the cashier's station, are switched to the proper salesman's station. These guides F are curved and extend downwardly, as shown in Figs. 9 and 10, and are secured by suitable curved supports $B^{11}$, projecting from the sleeve $B^{12}$, secured on one of the rods $B^{13}$, depending from the ceiling. The two rods or standards $B^{13}$ are held firmly together at their lower ends by cross-bar $B^{14}$. On said rods $B^{13}$ there is arranged an elevator-carriage G, having perforated ears G', which fit around the rods $B^{13}$. On the opposite side from the ears there is secured to the body of the carriage G a section of track $G^2$, corresponding in construction to the track A. To the rear of this section $G^2$ there is a pin $G^3$, journaled in the hollow piece $G^4$, forming a part of the carriage G. On the right-hand side of the said pin $G^3$ there is firmly secured an upright arm $G^5$, which has at its upper end a right-angle finger $G^6$, extending inwardly toward the rods $B^{13}$. There are provided at the lower end of this arm $G^5$ two fingers $G^7 G^8$, which are adapted one at a time to bear against the body of the elevator, so as to limit the range of movement of the vertical arm $G^5$. On the opposite side of the pin $G^3$ there is also firmly secured a substantially horizontal arm $G^9$. When it is desired by a salesman to send a carrier from the station to the cashier's desk, he places the carrier E on the section $G^2$, the hard-rubber fiber $E^9$ fitting into the trough of the same, and the horizontal extension $E^{14}$ of the movable member $E^{11}$ of the grip passes under the arm $G^9$ and lifts the same, which, being fixed to the pin $G^3$, acts on said pin and moves the vertical arm $G^5$ to a vertical position, limited by the finger $G^8$ contacting with the under side of the body of the elevator G. (See Figs. 11 and 15.)

A suitable cord H, having a handle H' within reach of the salesman, extends upwardly around a pulley $H^2$, secured to the ceiling down to the elevator G, to which it is secured at the point $H^3$.

The carrier having been placed by a salesman on the elevator G, as above described, he takes hold of the handle H' and raises the elevator G upwardly along the rods $B^{13}$. The continued ascent of the elevator by the salesman pulling on the cord H brings the pin $G^6$ on the vertical arm $G^5$ in contact with the upwardly-inclined side J' of the cam-piece J, which extends outwardly from a sleeve $J^2$, adjustably secured on one of the standards $B^{13}$ by a suitable set-screw. As the pull by the salesman continues the pin $G^6$ rides up alongside the incline $J'$ and is pressed from its upright position inwardly until it reaches the upper end of the incline $J'$, at which time the finger $G^7$ is in contact with the top of the carriage G. Now as the substantially vertical arm $G^5$ and the substantially horizontal arm $G^9$ are both fixed permanently to the pin $G^3$ any movement communicated to the arm $G^5$ will actuate the arm $G^9$. Therefore the continued inward movement of the arm $G^5$, by reason of the pin $G^6$ bearing against the cam-face $J'$, will cause the arm $G^9$ to bear down on the end $E^{14}$ of the movable member $E^{11}$ and cause the upper end of said movable member $E^{11}$ to move away from the upper end of the fixed member $E^{13}$ of the grip. Now when this position of the parts has been reached the upper ends of the members of the grip are bearing against the under side of the pivoted section $A^2$ of the track A, and the continued pull by the salesman causes the said members of the grip to lift said pivoted section and pass on each side of the cable D, which then extends through the slot $A^3$ of said pivoted track-section $A^2$, said slot acting to guide the cable, as shown in Fig. 11. In the continued ascent of the elevator the pin $G^6$ passes from the cam-face $J'$ upwardly and over the rearwardly-inclined face $J^3$ down on the opposite face $J^4$ of the cam-piece J, and when it passes over the face $J'$ to the face $J^3$ it moves toward a vertical position, and the arm $G^9$, being thus gradually released from its bearing-down position on the extension $E^{14}$ of the movable member $E^{11}$, is moved upwardly under the tension of the spring $E^{12}$, bearing against the under side of the movable member $E^{11}$ of the grip, and causes the member $E^{11}$ to close toward the fixed member $E^{13}$ around the cable D, and this takes place as the pin $G^6$ passes over from the face $J^3$ to the face $J^4$, (see Figs. 11 and 15,) and the section $G^2$ of the elevator is in perfect alinement with the continuation of the track $A'$, so that the cash-box gripped to the cable is at once carried off along the forwarding-track $A'$ to the cashier, and in its travel toward the cashier's station along the track $A'$ the horizontal extension $E^{14}$ of the movable member $E^{11}$ passes under the cam-face $K'$, which opens the grip and permits the box to pass away from the cable toward the cashier by momentum. The momentum of the box carries it to the end of the track $A'$, where it contacts with the rubber cushion $A^4$, and is removed through the opening $A^5$, formed by cutting away the side of the trough. The outer upper edge of the side of the trough in the vicinity of the cam $K'$ is slightly cut away at $A^6$ to permit the downward movement of the horizontal extension $E^{14}$ of the movable member $E^{11}$ of the grip, when the cam-face is acting on said horizontal extension $E^{14}$ at the time when the grip is opened and disengaged from the cable.

To return the box from the cashier to the salesman, it is inserted into the trough through the opening $A^7$, cut in the side of the trough A to permit the insertion of the hard-rubber fiber $E^9$, and after such insertion the box is moved along the trough until the horizontal extension $E^{14}$ comes under the cam-face $K^2$, by which it is pressed downward into the depression $A^8$, cut in the outer edge of the side of the trough A, which spreads the movable and fixed members of the grip, so that continued pushing of the box up the track A brings the cable D between the opening of the fixed and movable members $E^{11}$ and $E^{13}$, so that when the box has passed the cam-face $K^2$ the grip closes on the cable D and the box is despatched toward the respective salesman's station to which the said box belongs.

The cam-faces $K'$ $K^2$ are extensions from the brackets K, which extend between and are secured to the troughs A $A'$, forming the forwarding and return tracks of the system.

Any desired number of stations may be arranged along the return-track A from the cashier to the salesman, and the carriers belonging to each station may be switched from the track down to the salesman by means of diverting-flanges properly located on the sides of the box, which are adapted to coöperate with the guides F, secured to the brackets $B^{11}$, secured on the rods $B^{13}$. The position of the flanges $E^{15}$ on the sides of the box is varied to agree with the position of the diverting-guides F. For instance, the salesman's station nearest to the cashier would have the flanges $E^{15}$ located on the side of the box near the bottom and the upper edges of the diverting-guides F would be located lower than those shown in Fig. 10 in order to engage and pass between the sides of the flanges $E^{15}$. For the stations beyond the first station the position of the flanges $E^{15}$ would be gradually higher on the sides of the box, and correspondingly the diverting-guides F gradually raised to coöperate with the flanges on the box belonging to the proper station.

Figure 19:
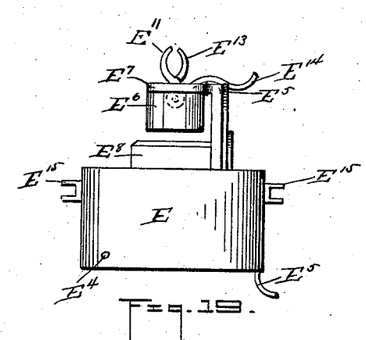
Figure 20:
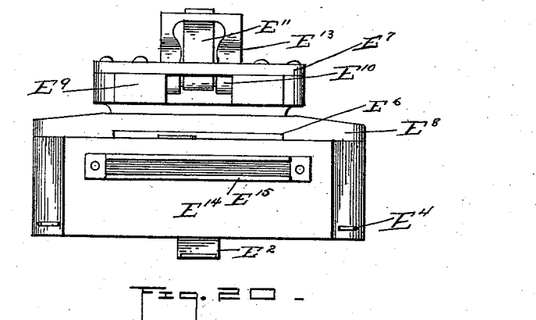
Figure 21:
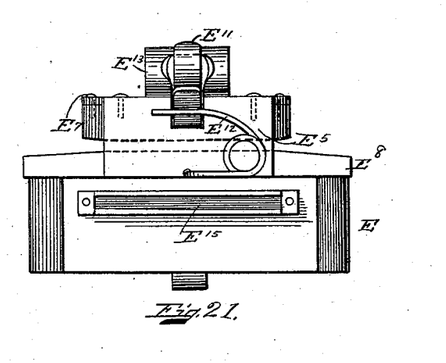

The cash-box shown at Fig. 19, for instance, is adapted to coöperate with the guides F, (shown in Fig. 10,) while the box shown in Fig. 16 is adapted to coöperate with the guides F, located as shown in Fig. 12, which are slightly lower than shown in Fig. 10, so that at the station farthest away from the cashier the guides F are located the highest, and also the flanges $E^{15}$ are located highest on the sides of the box to coöperate with the said guides F. The object of this, it will be seen, is to permit the box belonging to the stations farthest from the cashier to pass by and not be diverted by the guides F of other stations ahead of the station to which the box properly belongs, as the diverting-guides F are arranged lowest at the first station and gradually rise to the last station, wherefore they will not engage with the flanges $E^{15}$, located at such a height as not to engage with the guides F except at the station where the box is intended to be diverted down to the salesman.

At each salesman's station the track A is cut away, and in the place thereof there is arranged a flat spring L, secured at L' to the under side of the track A, and bearing at its opposite end against the under side of the continuation of the track A, and the object of this spring is to support and carry beyond the stations the carriers which are intended for the salesman beyond, and over the top of the spring there is located a guard M, which is adapted to prevent the jumping or throwing off of the carriers which are passing to the stations beyond. The carrier whose flanges $E^{15}$ engage with the diverting-guides F pulls the said spring L downward, as shown in dotted lines, Fig. 9, as it moves along the guides F until it passes beyond the spring, when the said spring returns to its normal position. The carrier continues its downward passage along the guides F until it reaches the bottom of the same, from which it can be removed by the salesman. This spring L therefore provides a means for supporting carriers which belong to stations beyond, and at the same time it does not interfere with the switching of the carrier belonging to the proper station.

At each station the operation of the carrier in connection with the spring is the same.

As the carrier whose flanges $E^{15}$ are engaged by the guides F moves along the same its momentum detaches it from the cable D without the necessity of providing any device for opening the grip. In other words, the momentum of the cash-box E, whose flanges $E^{15}$ are engaged by the guides F, pulls said box away from the cable D and passes by momentum and gravity down to the salesman along the said guides F. The diverting of the carriers for the respective stations is identical in each case.

Instead of the flat spring L the stations may be provided with straight strips of metal arranged to engage the graduated flanges on the sides of the boxes and support the boxes over said openings while passing to stations beyond.

Having thus ascertained the nature and set forth the construction of my invention, what I claim as new, and desire to secure by Letters Patent, is—

1. In a store-service apparatus, a track having an opening closed by a movable section, a motor-cable, a cash-box provided with a grip-catch having a fixed and movable member normally closed, an elevator arranged to conduct the cash-box through the opening in the track into position for the grip to engage the cable, and provided with a track-section for supporting the cash-box adapted in its upper position to aline with the track, and mechanism adapted to act on the movable member of the cable-grip on the upward movement of the elevator to open said grip to receive the cable and to release said member in order to grip the cable when the elevator has reached its upper limit of movement.

2. In a store-service apparatus, a forwarding and a return track, a motor-cable traveling therein, a cash-box adapted to move along and be supported on said track, means for automatically attaching said box to said cable, and a series of graduated diverting-guides arranged at the salesmen's stations for automatically diverting the cash-boxes from the track at the stations to which they respectively belong, the said return-track at the points where the cash-boxes are diverted being cut away to permit the switching of the cash-boxes, and a spring normally closing each of said cut-away portions.

3. In a store-service apparatus, a forwarding and a return track, a motor-cable traveling therein, a cash-box adapted to move along and be supported on said track, means for automatically attaching said box to said cable, a series of graduated diverting-guides arranged at the salesmen's stations for automatically diverting the cash-box from the track at the stations to which they belong, and a series of graduated flanges on the cash-boxes adapted to engage with the diverting-guides at the station at which the cash-box belongs, the said return-track at the points where the cash-boxes are diverted being cut away to permit the switching of the cash-boxes, and a spring normally closing each of said cut-away portions.

4. In a store-service apparatus, a forwarding and a return track, a motor-cable traveling therein, a cash-box adapted to move along and be supported on said track, means for automatically attaching said box to the said cable, and a series of graduated diverting-guides arranged at the salesmen's stations for automatically diverting the cash-boxes from the track at the stations to which they respectively belong, the said return-track at the points where the cash-boxes are diverted being cut away to permit the switching of the cash-boxes, a spring normally closing each of said cut-away portions, and a guard extending over each of said cut-away portions to prevent the displacement of the cash-boxes passing to the stations beyond.

5. In a store-service apparatus, a track, a motor-cable, a cash-box provided with a grip-catch normally closed, an elevator arranged to conduct said cash-box into position for the grip to engage said cable, mechanism located on said elevator and having an arm adapted to contact with one of the members of the grip-catch when the cash-box is placed on the elevator, and means adapted when engaged by said mechanism in the upward movement of the elevator to cause said arm to open the grip to receive the cable and adapted to release said grip from the pressure of said arm in order to grip the cable when the elevator has reached its upper limit of movement.

6. In a store-service apparatus, a track, a motor-cable, a cash-box provided with a grip-catch normally closed and consisting of a fixed and a movable member, an elevator arranged to conduct the cash-box into position for the grip to engage the said cable, mechanism located on said elevator and having an arm adapted to contact with the movable member of the grip-catch, and means adapted when engaged by said mechanism in the upward movement of the elevator to cause said arm to move said movable member to open the grip to receive the cable and adapted to release said member in order to grip the cable when the elevator has reached its upper limit of movement.

In testimony whereof I have signed my name to this specification, in the presence of two subscribing witnesses, on this 11th day of September, 1894.

JAMES T. COWLEY.

Witnesses:
E. L. HARLOW,
S. H. TROW.